(12) United States Patent
Watanabe et al.

(10) Patent No.: US 6,853,749 B2
(45) Date of Patent: Feb. 8, 2005

(54) INFORMATION COMMUNICATIONS APPARATUS

(75) Inventors: Shinichi Watanabe, Kanagawa (JP); Hideki Honma, Tokyo (JP)

(73) Assignee: Panasonic Communications Co. Ltd., Tokyo (JP)

( * ) Notice: Subject to any disclaimer, the term of this patent is extended or adjusted under 35 U.S.C. 154(b) by 628 days.

(21) Appl. No.: 09/995,714

(22) Filed: Nov. 29, 2001

(65) Prior Publication Data

US 2002/0071606 A1 Jun. 13, 2002

(30) Foreign Application Priority Data

Dec. 13, 2000 (JP) ........................................ 2000-378369

(51) Int. Cl.[7] .............................. G06K 9/34; G06K 9/00
(52) U.S. Cl. ...................................... 382/177; 382/187
(58) Field of Search ................................ 382/177, 178, 382/181, 182, 186, 187, 190, 290, 305; 358/406, 443, 444, 451, 537; 707/4, 500, 523, 530

(56) References Cited

U.S. PATENT DOCUMENTS

| | | | | |
|---|---|---|---|---|
| 4,009,466 A | * | 2/1977 | Clark ........................... | 382/165 |
| 4,295,121 A | * | 10/1981 | Enser et al. ................. | 382/177 |
| 4,449,239 A | * | 5/1984 | Bernhardt et al. .......... | 382/177 |
| 4,797,940 A | * | 1/1989 | Sato et al. ................... | 382/177 |
| 5,809,166 A | * | 9/1998 | Huang et al. ................ | 382/178 |
| 5,850,477 A | * | 12/1998 | Takada ........................ | 382/186 |
| 5,870,492 A | * | 2/1999 | Shimizu et al. ............. | 382/187 |
| 5,940,189 A | * | 8/1999 | Matsubara et al. .......... | 385/440 |
| 5,991,439 A | * | 11/1999 | Tanaka et al. ............... | 382/178 |
| 6,014,460 A | * | 1/2000 | Fukushima et al. ......... | 382/177 |
| 6,115,506 A | * | 9/2000 | Koshinaka ................... | 382/290 |
| 6,148,105 A | * | 11/2000 | Wakisaka et al. ........... | 382/190 |
| 6,252,984 B1 | * | 6/2001 | Haneda et al. .............. | 382/181 |
| 6,272,244 B1 | * | 8/2001 | Takahashi et al. .......... | 382/190 |
| 6,289,123 B1 | * | 9/2001 | Xiaomang et al. .......... | 382/181 |
| 6,366,698 B1 | * | 4/2002 | Yamakita ..................... | 382/187 |
| 6,470,336 B1 | * | 10/2002 | Matsukawa et al. ........... | 707/4 |

FOREIGN PATENT DOCUMENTS

| | | | | |
|---|---|---|---|---|
| JP | 63221738 | | 9/1988 | ........... H04L/11/20 |
| JP | 07200721 | | 8/1995 | ............ G06K/9/00 |
| JP | 08163303 | | 6/1996 | ............ H04N/1/00 |
| JP | 11313190 | | 11/1999 | ............ H04N/1/00 |
| JP | 2000332991 | | 11/2000 | .......... H04N/1/387 |

OTHER PUBLICATIONS

English Language Abstract of JP Appln. No. 63–221738.
English Language Abstract of JP Appln. No. 7–200721.
English Language Abstract of JP Appln. No. 8–163303.
English Language Abstract of JP Appln. No. 11–313190.
English Language Abstract of JP Appln. No. 2000–332991.

* cited by examiner

*Primary Examiner*—Andrew W. Johns
*Assistant Examiner*—Amir Alavi
(74) *Attorney, Agent, or Firm*—Greenblum & Bernstein, P.L.C.

(57) ABSTRACT

A character recognition section generates character recognition result information resulting from character recognition of image information. An image information cutout section cuts out character recognition image information, corresponding to an area as to which the character recognition is performed, from the image information. A recognition result generation section generates recognition result information which is composed of the character recognition result information and the character recognition image information. A recognition result transmission section transmits the recognition result information to other terminals using electronic mail. As a result, an information communications apparatus of the invention can make transmissions of information to the wide area, without increasing the network load, which is to be used for the determination of whether or not a character recognition has been accurately performed.

10 Claims, 9 Drawing Sheets

Fig. 3

| IFAX from address | Destination mail server | Destination mail account |
|---|---|---|
| Ifax001@iaa.or.jp | 192.168.0.100 | AAA |
| Ifax002@iaa.or.jp | 192.168.0.100 | BBB |
| Ifax003@iaa.or.jp | 192.168.0.200 | CCC |

Fig. 8

```
Mime-Version:1.0
Content-Type:Multipart/Mixed;Boundary= "_"         } 801
Content-Transfer-Encoding:7 bit ....                    → Mail Boundary
Content-Type:Text/Plain;Charset=us-ascii           } 802
Content-Transfer-Encoding:7 bit BEGIN OK              } 703a
1=ALPHABET=HONMA      } 703b
2=NUMBER=29           } 703c                        } 703
3=MARK=ON             } 703d
END ....                    → Mail Boundary
Content-Type:Image/Tiff;Name= "image.tif"
Content-Transfer-Encoding:Base 64                  } 803
Content-Description:image.tif

CCSSAFSASODKSAODASHDIUW7DSOFI
.... [BASE64]
ASKUDHIASUDHSADHOSAI=

:                                           } 702

....
```

800

INFORMATION COMMUNICATIONS APPARATUS

BACKGROUND OF THE INVENTION

1. Field of the Invention

The present invention relates to an apparatus that recognizes the characters in image data of an original document and transmits the recognized character data.

2. Description of Related Art

Conventionally, an original document (image) data is read by a scanner or an original document data is transmitted by facsimile transmission and a character recognition operation is performed. Further, conventionally the results of the character recognition is converted to code data and such code data is transmitted to a database and stored in a database format.

However, in some situations character recognition was not performed accurately, for reasons such as a reading error in the document, etc. In such cases, there is a possibility that the recognized character data which contains errors is stored as part of a database. Accordingly, it is necessary to check whether or not the recognized character data is accurate at an editing terminal at the end of the database and to edit the same if necessary.

Furthermore, an editing terminal at the end of the database and a character recognition apparatus are connected via a network and are located far apart from each other. Therefore, although the editing terminal can check on the character recognition result information, it cannot check on the original document that was being read. That is, the editing terminal is only able to check on the character recognition result information; but is not able to compare the original document with the character recognition result information. Therefore, it is difficult to judge, at the editing terminal, whether or not the character recognition was accurately performed.

Further, it is conceivable to transmit the read image information to an editing terminal without conversion. However, in this case, a problem arises because the amount of the data being transmitted becomes large; and correspondingly, the network load becomes large.

Furthermore, conventionally, a character recognition apparatus and an editing terminal are connected through dedicated lines, and communications are conducted with a dedicated protocol. Therefore, a further problem is that a system having a character recognition apparatus and an editing terminal cannot be used for general purposes but can only be used by and among the specified users.

SUMMARY OF THE INVENTION

An object of the present invention is to provide an information communications apparatus that can perform transmissions of information to a wide area, without increasing the network load, which is to be used for the determination of whether or not a character recognition has been accurately performed.

In the present invention, in order to solve the problem mentioned above, the information communications apparatus comprises a character recognition section that generates character recognition result information resulting from character recognition of image information and an image information cutout section that cuts out character recognition image information from the image information. The character recognition image information corresponds to an area with respect to which the character recognition is performed and a recognition result generation section generates recognition result information which comprises the character recognition result information and the character recognition image information. A recognition result transmission section transmits the recognition result information to other terminals using electronic mail.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 is a figure showing the configuration of the destination table of the above-noted embodiment mode;

FIG. 8 is a figure showing an example of electronic mail which the recognition result generation unit of the above-noted embodiment mode creates in case the character recognition is successful;

DETAILED DESCRIPTION OF PREFERRED EMBODIMENTS

One embodiment mode of the present invention relating an information communications apparatus will be explained below with reference to the accompanying drawings.

Figure 1:
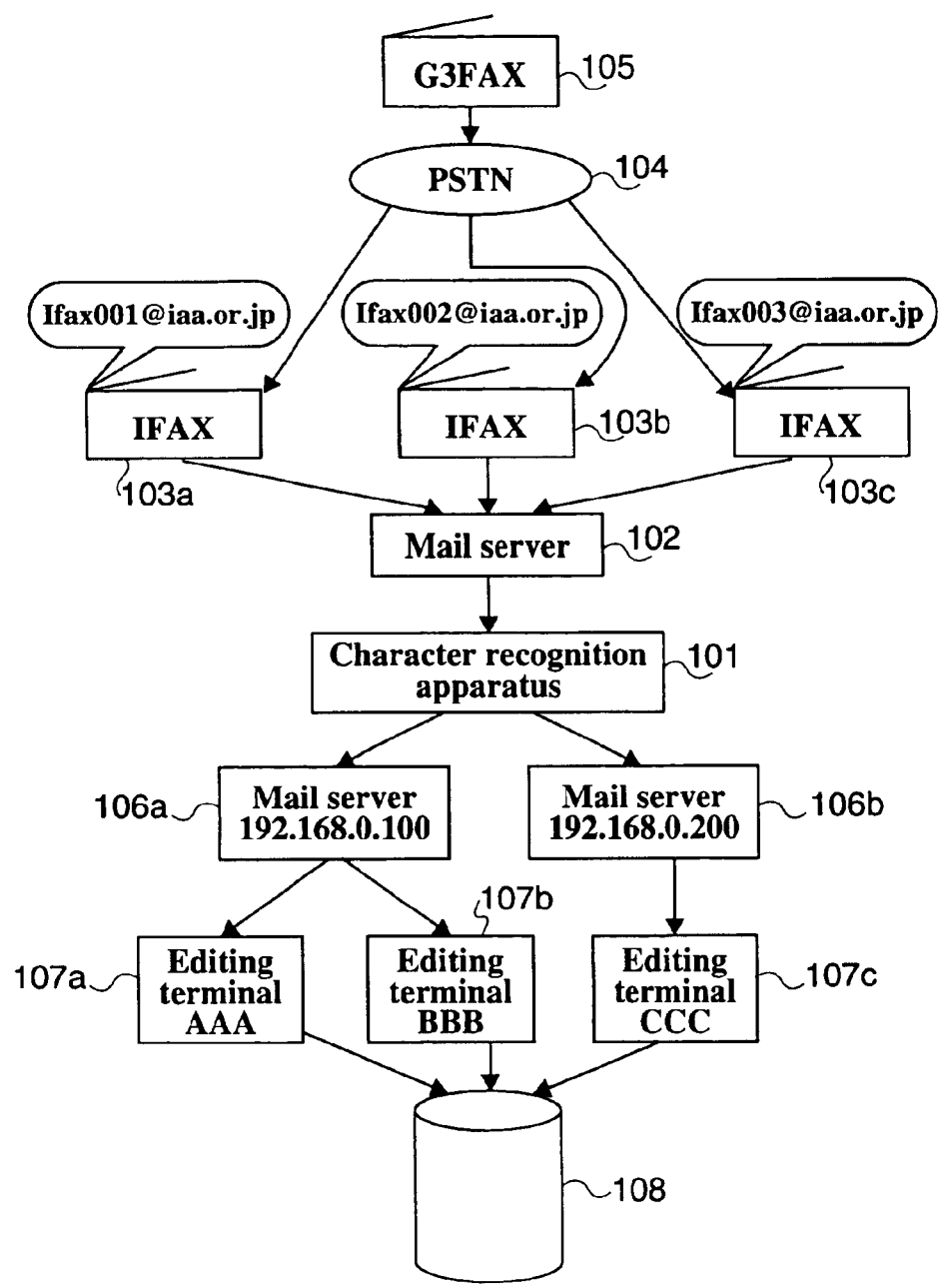
FIG. 1 is a schematic diagram of a communications system including a character recognition apparatus of one embodiment of the present invention.

First of all, a communications system will be explained with reference to FIG. 1. The system includes a character recognition apparatus. The character recognition apparatus is an information communications apparatus that performs a character recognition operation the original document data which has been transmitted, and further transmits such character-recognized data. FIG. 1 is a schematic diagram of a communications system including a character recognition apparatus of one embodiment mode of the present invention.

The communications system is provided with a character recognition apparatus 101, which receives image information from other terminals and character-recognizes the received image information. Further, the character recognition apparatus 101 generates a single electronic mail that contains character recognition result information obtained by the character recognition operation and cutout image information that corresponds to the area of the received image information where the character recognition operation has been performed, and transmits the same to other terminals by electronic mail using the SMTP protocol.

Here, in this information system, a mail server 102, a plurality of Internet facsimile apparatuses (hereinafter referred to as IFAX) 103a–103c, a PSTN 104 and a G3 facsimile apparatus (hereinafter referred to as G3FAX) 105 are provided as means to transmit image information to the character recognition apparatus 101. Other image information transmission devices can be employed.

More specifically, the IFAX 103a–103c are connected, via the mail server 102, to the character recognition apparatus 101. Further, the G3FAX 105 is connected to the IFAX 103a–103c via the public service telephone network (hereinafter referred to as PSTN) 104.

By this arrangement, the image information of the original document read by the G3FAX 105 is sent to IFAX 103a–103c via PSTN 104 in accordance with the facsimile protocol. These IFAX 103a–103c are provided with the addresses, Ifax001@iaa.or.jp, Ifax001@iaa.or.jp, Ifax001@iaa.or.jp, respectively. Therefore, by inputting an address of the desired IFAX 103a–103c into G3FAX 105, it can be freely determined to which one of these IFAX 103a–103c the image information of original document should be transmitted.

These IFAX 103a–103c convert the image information transmitted from the G3FAX 105 into a format that conforms to an electronic mail, and transmit the same to the mail server 102 in accordance with the SMTP protocol. Further, the image information read by the G3FAX 105 is transmitted from the mail server 102 to the character recognition apparatus 101.

Incidentally, in this embodiment mode, as a mechanism for transmitting the image information to the character recognition apparatus 101, the above described configuration is adopted; however, it is also within the scope of the present invention to adopt a configuration wherein these IFAX 103a–103c read the image information of the original document and this image information is transmitted to the character recognition apparatus 101 via the mail server 102. Further, it is also within the scope of the present invention to adopt a configuration such that the image information of the original document is read by an image reading apparatus, such as a scanner, and the character information of the original document is recognized from such image information.

Further, a plurality of editing terminals 107a–107c are connected to the character recognition apparatus 101 via a plurality of mail servers 106a, 106b. The editing terminals 107a–107c compare the resultant character recognition information obtained by character recognition of image information of an original document, which is contained in the electronic mail transmitted from the character recognition apparatus 101 in accordance with the SMTP protocol, with the image information corresponding to the area where the character recognition has been performed. Further, the editing terminals 107a–107c will perform an editing operation in case where, as a result of such comparison, a difference is found between the resultant character recognition information obtained by the character recognition and the content of the image information of the area where the character recognition has been performed on the received image information, and thereby, it is determined that the character recognition was not accurately performed. Further, the editing terminals 107a–107c transmit to the database 108 the character recognition result information that has been edited. The database 108 stores the character recognition result information transmitted thereto.

Further, the mail servers 106a, 106b are provided with IP addresses, 192.168.0.100 and 192.168.0.200, respectively. The editing terminals 107a–107c are provided with mail accounts, AAA, BBB and CCC, respectively.

The character recognition apparatus 101 determines to which editing terminals 107a–107c and via which mail servers 106a or 106b electronic mail should be transmitted depending on from which of IFAX 103a–103c the transmitted image has been transmitted to the character recognition apparatus 101.

Figure 2:
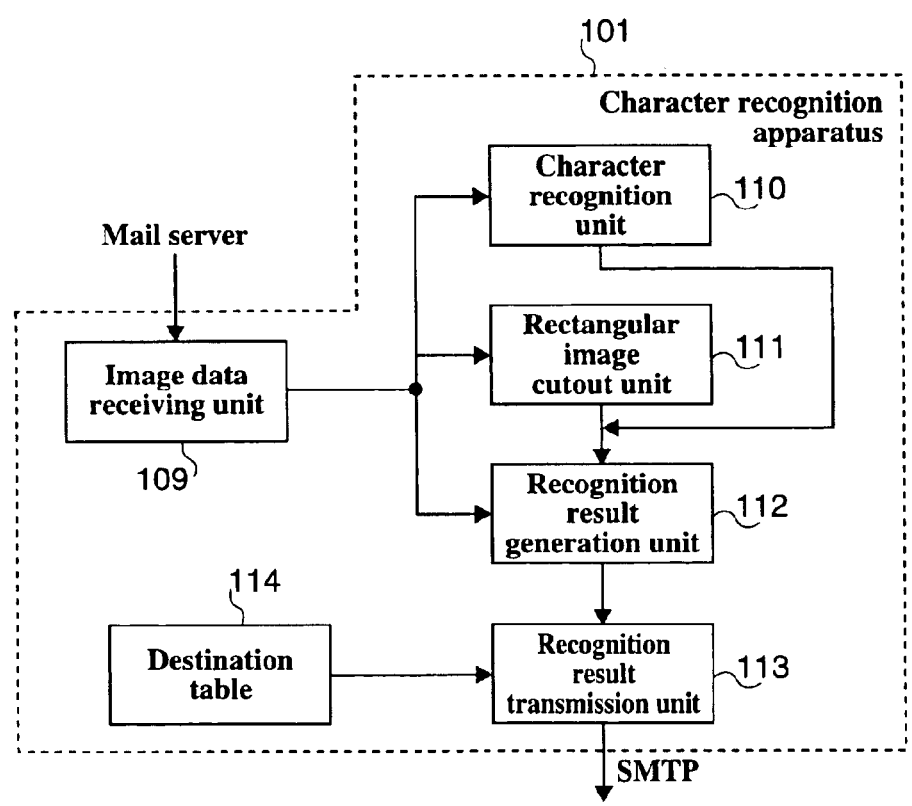
FIG. 2 is a block diagram of the character recognition apparatus of the above-noted embodiment mode.

Next, the configuration of the character recognition apparatus 101 of the present invention will be explained in detail with reference to FIG. 2. FIG. 2 is a block diagram of the character recognition apparatus 101 of the above-noted embodiment mode.

The character recognition apparatus 101 is provided with an image information reception unit 109 that receives image information transmitted thereto. The image information reception unit 109 receives image information that is transmitted from the mail server 102 and sends the received image information to a character recognition unit 110 and a rectangular image cutout unit 111.

The character recognition unit 110 has an OCR(optical character recognition) function by which character information is recognized from the transmitted image information as well as an OMR(optical mark recognition) function by which marks of the transmitted image information are recognized. Further, the character recognition unit 110 sends character recognition result information obtained by the character recognition as a code data to a recognition result generation unit 112.

The rectangular image cutout unit 111 cuts out a rectangular image that corresponds to the area where the character recognition operation is performed (character recognition image information) from the transmitted image. The rectangular image cutout unit 111 sends the cutout rectangular image to the recognition result generation unit 112. The details of rectangular cutout operation performed the rectangular image cutout unit 111 will be explained later.

The recognition result generation unit 112 generates electronic email by attaching the image information sent from the rectangular image cutout unit 111 to the character recognition image information, which is a code data sent from the character recognition unit 110. The recognition result generation unit 112 sends the electronic mail data generated to the recognition result transmission unit 113. The details of operation of the generation of electronic mail data that is the recognition result information of the recognition result generation unit 112 will be explained later.

The recognition result transmission unit 113 transmits the electronic mail data sent from the recognition result generation unit 112 to other terminals such as the mail servers 106a and 106b. The recognition result transmission unit 113 refers to the destination table 114 when transmitting the electronic mail data to the other terminals. And, the recognition result transmission unit 113 determines to which editing terminals 107a–107c and via which mail servers 106a or 106b the electronic mail data should be transmitted depending on from which of IFAX 103a–103c the transmitted image information has been transmitted thereto.

Now, the configuration of the destination table 114 will be explained with reference to FIG. 3. FIG. 3 shows the configuration of the destination table 114 of the above embodiment mode.

As apparent from the figure, in the destination table 114, a plurality of sets of data are stored. The data sets include consisting: the addresses 301 of the IFAX 103*a*–103*c*; the addresses 302 of mail servers 106*a* and 106*b* of the destination; and the mail account 303 of editing terminals of the destination. Since the destination table 114 is configured in this way, by making reference to the destination table 114, the recognition result transmission unit 113 can easily and properly switch between the destination mail servers 106*a* and 106*b* as well as among the editing terminals 107*a*–107*c* in accordance with the sender of the transmission, i.e., IFAX 103*a*–103*c*.

With the forgoing configuration, the character recognition apparatus 101 transmits, to other terminals, the character recognition result information of the transmitted image information and the rectangular cutout corresponding to the part where the character recognition is performed.

Figure 4:
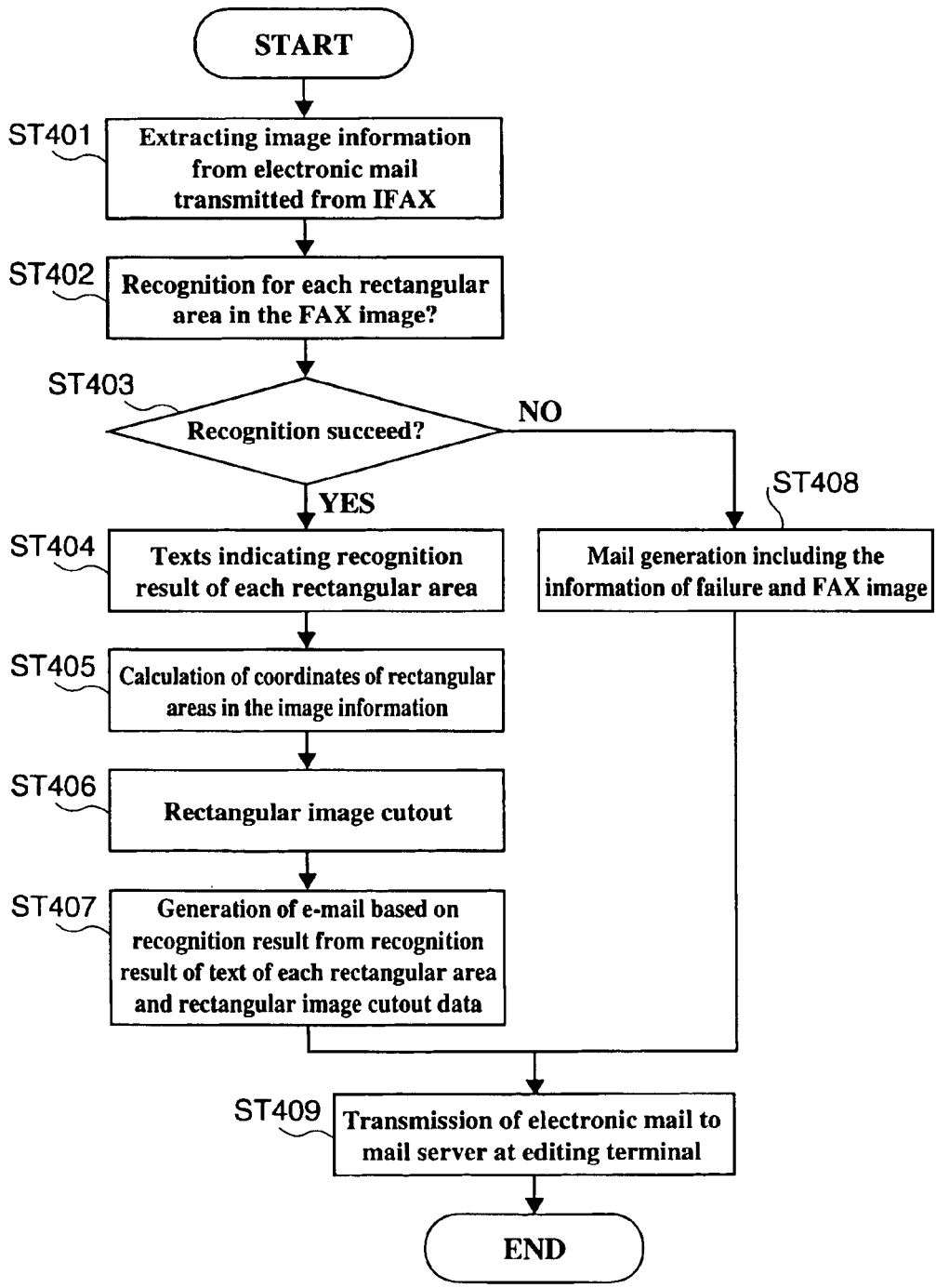
FIG. 4 is a flow chart of the operation of the character recognition apparatus of the above-noted embodiment mode.

Next, the operation of the character recognition apparatus 101 will be explained in detail with reference to FIG. 4. FIG. 4 is a flow chart of the operation of the character recognition apparatus 101 of the above embodiment mode.

Figure 5:
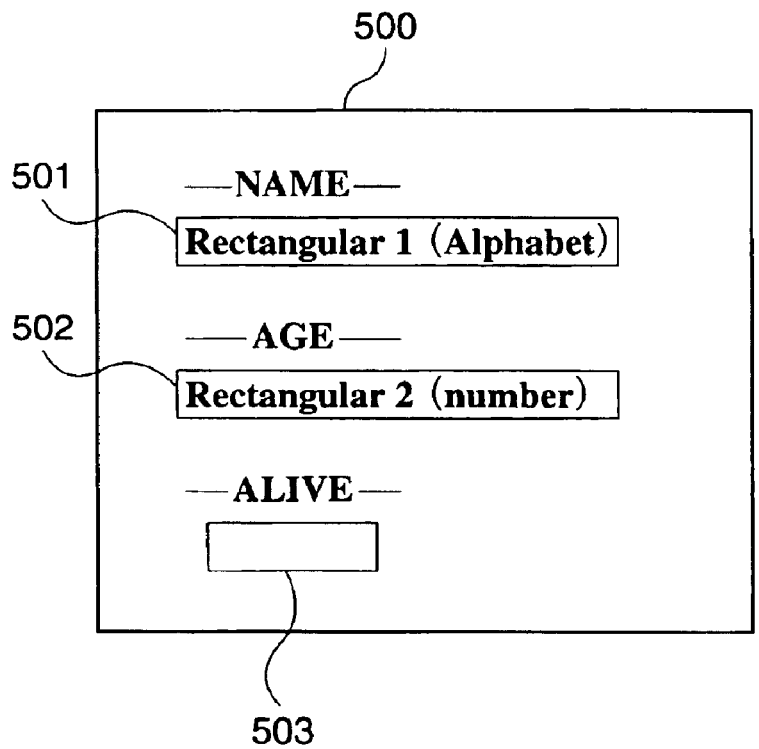
FIG. 5 is a figure showing the form document of the above-noted embodiment mode.

In this mode of embodiment, the explanation will be made assuming that the form document 500 as shown in FIG. 5 is read by the G3FAX 105 and the image information of the document so read is being sent via PSTN 104, IFAX 103*a*–103*c*, and the mail server 102 to the character recognition apparatus 101. Here, FIG. 5 shows the form document of the above embodiment mode.

First, the form document 500 in this embodiment mode is explained with reference to FIG. 5. The form document 500 in this embodiment mode is used in case of a disaster, to enable a confirmation as to whether or not a victim of the disaster is alive. More specifically, the form document 500 is provided with a rectangular area 501 where the name of the victim will be written; a rectangular area 502 where the age of the victim will be written; and a rectangular area 503 where a marking is to be provided to indicate whether or not the victim is alive.

Someone assisting the victims of a disaster has a G3FAX 105, which is provided at the stricken or disaster area, and which reads a form document 500 in which necessary information is filled out. They input the destination; thereby, the image information of the form document so read is sent to the character recognition apparatus 101 via PSTN 104, IFAX 103*a*–103*c* and the mail server 102.

The character recognition apparatus 101 receives the electronic mail transmitted from IFAX 103*a*–103*c* by the image information reception unit 109. The image information transmitted from IFAX 103*a*–103*c* is transmitted as attachments to the electronic mail. Therefore, at first, the character recognition apparatus 101 extracts the image information from the received electronic mail (ST401). Then, the image information reception unit 109 sends the image information extracted to the character recognition unit 110 as well as to the rectangular image cutout unit 111.

Next, the character recognition apparatus 101 performs, through the character recognition unit 110 thereof, the character recognition as well as the blackened mark recognition (recognition as to whether the mark area 503 provided has been blackened) over the rectangular areas that are included in the image information extracted in ST401, namely, these rectangular areas 501–503 as shown in FIG. 5 (ST402). Then, the character recognition unit 110 determines whether or not the character recognition and the blackened mark recognition are accurately performed in ST402 (ST403). This is because depending upon whether or not the character recognition unit 110 has accurately performed the character recognition and the blackened mark recognition, a selected one of the following processes will be performed.

If the character recognition unit 110 determines that the character recognition unit 110 has accurately performed the character recognition in ST403, the character recognition unit 110 generates recognition result text information from the character and the blackened mark recognition results in each of the rectangular areas 501–503 contained in the form document 500 (ST404).

Next, the character recognition apparatus 101 proceeds to the extraction process of these rectangular areas 501–503 with respect to which the character recognition and the blackened mark recognition have been performed. First, the rectangular image cutout unit 111 of the character recognition apparatus 101 calculates the coordinates, for example, the apex or corner coordinates of each of the rectangular areas, to determine the rectangular areas 501–503 that are contained in the transmitted image information (ST405). Then, the rectangular image cutout unit 111 cuts out or extracts the image information of these rectangular areas 501–503 using the coordinates of the rectangular areas in ST405 (ST406).

However, at the editing terminals 107*a*–107*c*, even when looking at the cutout images within the rectangular areas 501–503, there is a possibility that no one understands what the image information is for. Therefore, this invention also incorporates certain ideas or concepts relating to the way in which the image information corresponding to these rectangular areas are extracted.

Figure 6:
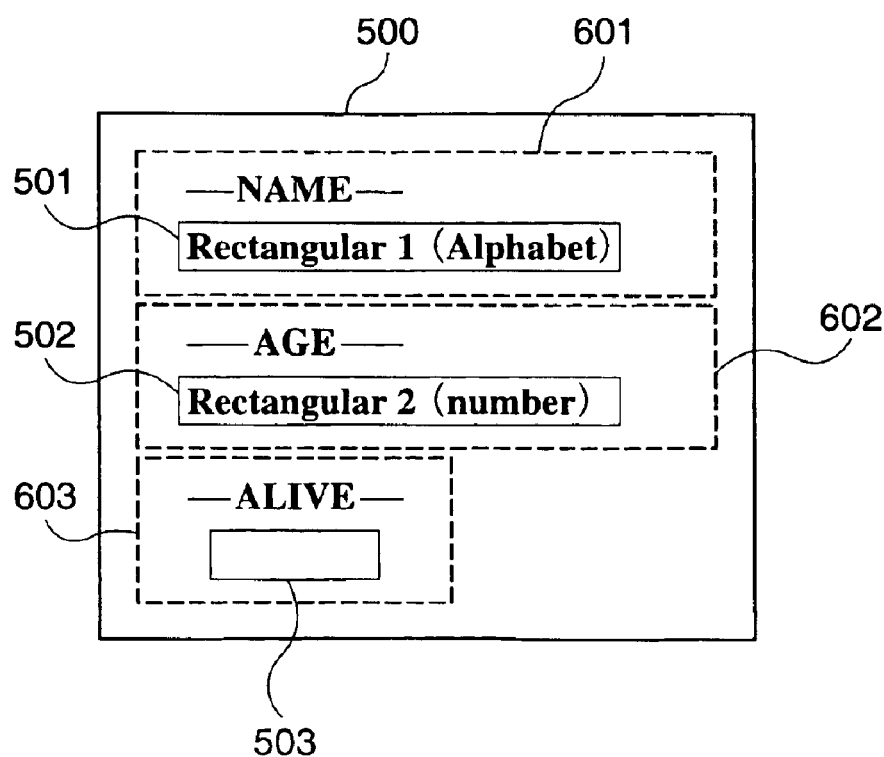
FIG. 6 is a diagram to explain the rectangular image cutting out operation of the rectangular image cutout unit of the above-noted embodiment mode.

The rectangular image cutting-out operation of the rectangular image cutout unit 111 will be explained in detail below with reference to FIG. 6. FIG. 6 is a diagram to explain the rectangular image cutting out operation of the rectangular image cutout unit 111 of the above mode of embodiment.

The rectangular image cutout unit 111 cuts out larger areas, in terms of width as well as height, as shown by the rectangular areas 601–603 in the figure, for the respective rectangular areas 501–503. This is because, as well understood from the figure, the information indicating what kind of information is contained these rectangular areas 501–503 is provided outside these rectangular areas 501–503. For example, the notations indicating that the rectangular area 501 is for the name, the rectangular area 502 is for the age and the rectangular area 503 is for whether or not alive, are written outside these rectangular areas 501–503 but inside the rectangular areas 601–603.

In this way, the rectangular image cutout unit 111 cuts out the image information of the rectangular areas 601–603, and by transmitting this cutout image information to the editing terminals 107*a*–107*c*, at these editing terminals 107*a*–107*c*, it is clearly understood what information should be contained in these rectangular areas 501–503.

Next, the character recognition apparatus 101 generates, at the recognition result generation unit 112 thereof, a recognition result data that is composed of the recognition result of character recognition and blackened mark recognition in ST402 and the image of rectangular cutout in ST406. And, the recognition result generation unit 112 generates electronic mail from the recognition result data so generated (ST407).

Figure 7:
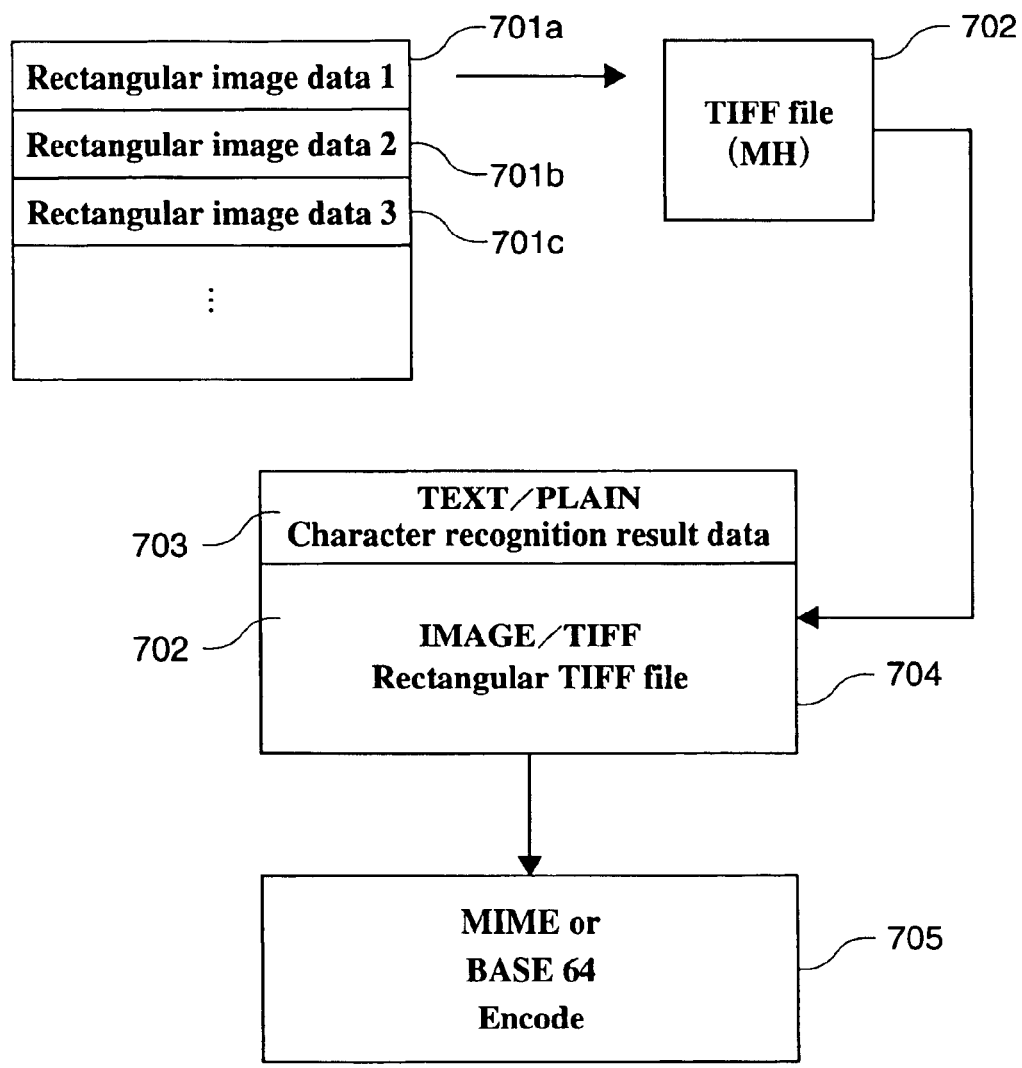
FIG. 7 is a diagram to explain the operation of recognition result generation unit of the above-noted embodiment mode.

The recognition result generation operations of the recognition result generation unit 112 will be explained with reference to FIG. 7. FIG. 7 is a diagram to explain the operation of recognition result generation unit of the above embodiment mode.

First, the recognition result generation unit 112 creates a rectangular TIFF file 702, which is a multi-page TIFF file, comprising: the rectangular image data 701*a* that corresponds to the rectangular area 601 of the form document 500; the rectangular image data 701*b* that corresponds to the rectangular area 602 of the form document 500; and the rectangular image data 701*c* that corresponds to the rectangular area 603 of the form document 500, all of which are cut out by the rectangular image cutout unit 111. The rectangular TIFF file 702 consists of encoded data in accordance with the Modified Huffman(MH) encoding. Further, the numbers of these rectangular image data 701*a*–701*c* are the page numbers in the TIFF file.

Next, the recognition result generation unit 112 creates a recognition result data 704 comprising: the character recognition result and the blackened mark recognition result data 703 that is recognized by the character recognition unit 110 in ST404; and the rectangular TIFF file 702. Then, the recognition result generation unit 112 encodes the recognition result data 704 into MIME or BASE64 to create an electronic mail data 705.

In FIG. 8, one example of the recognition result data 800 is shown. FIG. 8 is a figure showing one example of electronic mail which the recognition result generation unit 112 of the above embodiment mode creates in case the character recognition is successful.

As can be understood from FIG. 8, in the recognition result data 800, which is an electronic mail data, the entire mail header 801, a mail header 802 of the character recognition result data 703, the character recognition result data 703, a mail header 803 of the rectangular TIFF file 702 and the rectangular TIFF file 702 itself are written. In this example, the rectangular TIFF file 702 is encoded into Base64.

Furthermore, in the character recognition result data 703, at the area indicated with 703*a* in the figure, "OK" which indicates the successful character recognition is written; at the area indicated with 703*b* in the figure, "HONMA" which is the character recognition result corresponding to the rectangular image data 1 is written; at the area indicated with 703*c* in the figure, "29" which is the character recognition result corresponding to the rectangular image data 2 is written; and at the area indicated with 703*d* in the figure, "ON" which is the character recognition result corresponding to the rectangular image data 3 is written.

From this character recognition result data 703, at the editing terminals 107*a*–107*c*, it will be understood that the name of the victim of the disaster is "HONMA"; the age is 29 and the victim is alive. Further, in the recognition result data 800, included is the rectangular image data corresponding to the area where the character recognition is performed; therefore, the contents of the rectangular image data that corresponds to the area where the character recognition has been performed can be known at the editing terminal 107*a*–107*c*. As a result, at the editing terminals 107*a*–107*c*, it can be confirmed whether or not the character recognition has been accurately performed by looking at the transmitted rectangular image data. Further, the rectangular image data transmitted to the editing terminals 107*a*–107*c* is of a multi-page TIFF file and a page number is assigned to each rectangular image data. Because of this, it is easy to maintain a correspondence between the rectangular image data and the character recognition result data 703.

Figure 9:
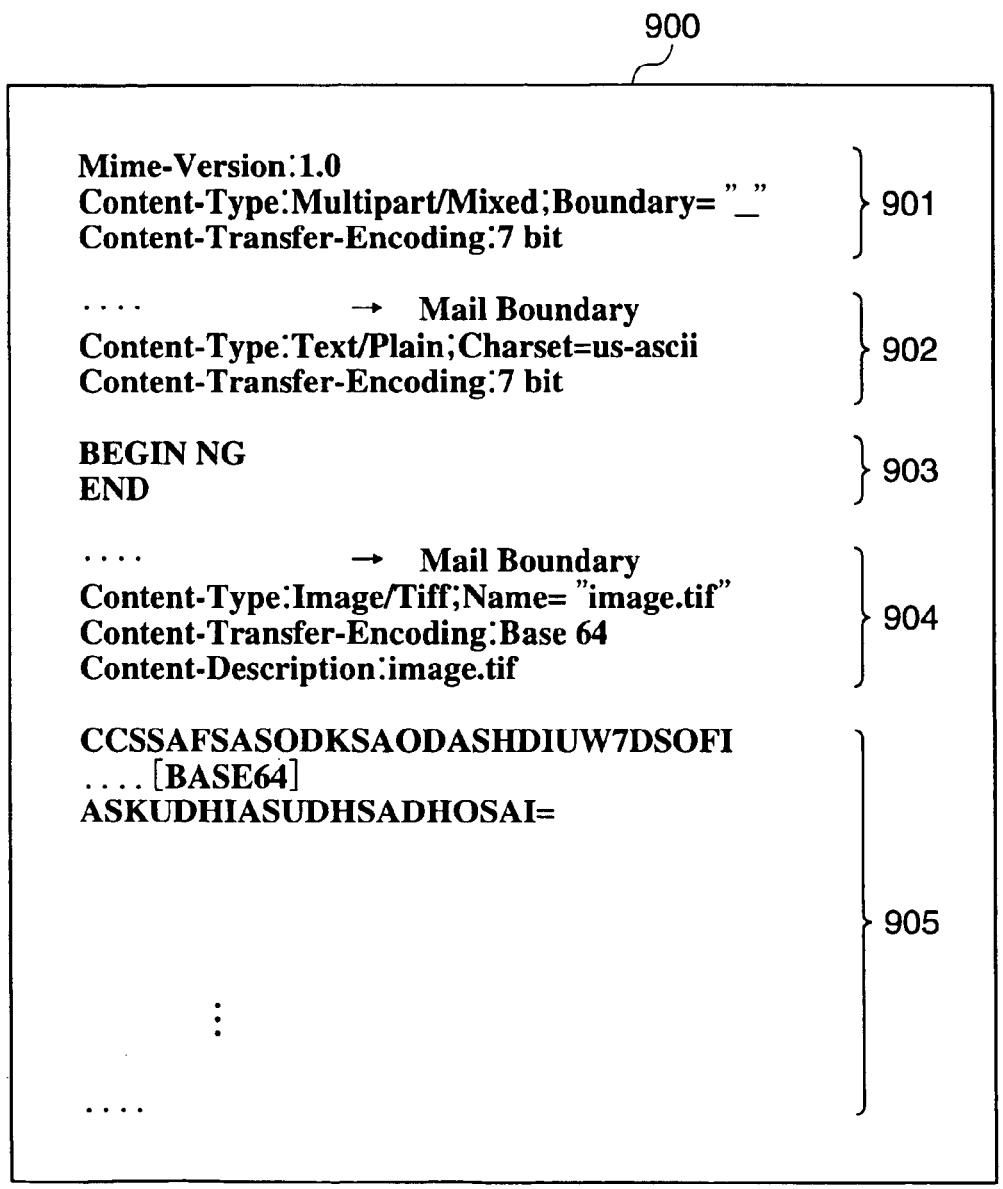
FIG. 9 is a figure showing an example of the electronic mail that the recognition result generation unit creates in case the character recognition has failed.

On the other hand, in case that the character recognition unit 110 determines that the character recognition has failed in ST403, the recognition result generation unit 112 composes: the information that the character recognition result is a failure; and the image information extracted by the image information reception unit 109 in ST401. And, the recognition result generation unit 112 encodes this composed information and creates electronic mail (the recognition result data) (ST408). FIG. 9 shows an example of the electronic mail that the recognition result generation unit 112 creates in case the character recognition has failed.

As can be understood from FIG. 9, in this recognition result data 900, the character recognition result data at the region indicated by 903 in the figure and the image information that the image information reception unit 109 extracted at the region indicated by 905 in the figure are included. Further, in the recognition result data 900, the entire mail header 901, the mail header 902 of the character recognition result data 903 and the mail header 904 of the image information 905, are written. Further, in this example, in the character recognition result data 903, "NG" is written to indicate the character recognition failure. Further, the rectangular TIFF file 703 is encoded with Base64.

In this way, the fact that the character recognition has failed can be transmitted to the editing terminals 107*a*–107*c*. Further, in case that the character recognition has failed, by attaching to the electronic mail the whole image information that the image information reception unit 109 has extracted, the image information that the G3FAX 105 read can be recognized at the editing terminals 107*a*–107*c*. Accordingly, it becomes possible to know the reason for the character recognition failure at the editing terminals 107*a*–107*c*. Furthermore, since at the editing terminals 107*a*–107*c*, the whole image information can be recognized, while viewing the image information, the character recognition can be done at the editing terminals 107*a*–107*c* and the result of such recognition can be stored in the database 108.

Next, the character recognition apparatus 101 transmits, by using the recognition result transmission unit 113, the recognition result data that is created by the recognition result generation unit 112 in ST407 or ST408 to the mail servers 106*a* and 106*b*, which are on the side of the editing terminals 107*a*–107*c*, using SMTP protocol (ST409).

Here, the recognition result transmission unit 113 distributes the destinations of the recognition result data such that the respective loads on the network formed by the character recognition apparatus 101 and the mail servers 106*a* and 106*b*; the network formed by the mail servers 106*a* and 106*b* and the editing terminals 107*a*–107*c*; and between the mail servers 106*a* and 106*b*; and the editing terminals 107*a*–107*c*, are well balanced.

More specifically, FROM Addresses (set by the IFAX Apparatus) of IFAX 103*a*–103*c* that are assigned when an electronic mail transmission of a Fax image to the character recognition apparatus 101 is undertaken are extracted. Next, the character recognition apparatus 101 determines the mail server 106*a* or 106*b* through which the electronic mail is being transmitted and one of the editing terminal 107*a*–107*c* in response to the addresses of the IFAX 103*a*–103*c* making a reference to the destination table 114. Then, the character recognition apparatus 101 transmits the recognition result data via the route so determined.

For example, in the case where the image information is transmitted from the IFAX 103*a* to the character recognition apparatus 101, the recognition result data is transmitted to the editing terminal 107*a* through the mail server 106*a*. And, in the case where the image information is transmitted from the IFAX 103*b* to the character recognition apparatus 101, the recognition result data is transmitted to the editing terminal 107*b* through the mail server 106*a*. And, in the case where the image information is transmitted from the IFAX 103*c* to the character recognition apparatus 101, the recognition result data is transmitted to the editing terminal 107*c* through the mail server 106*b*.

As such, in accordance with the addresses of IFAX 103*a*–103*c* from which the image information are being transmitted, the mail servers which are to be used in transmitting the recognition data as well as the editing terminals 107*a*–107*c* are switched; therefore, it is possible to maintain well balanced loads on the networks, the mail server 106*a* and 106*b*, and the editing terminals 107*a*–107*c*.

As explained thus far, in the above embodiment mode, the character recognition result information and only the rectangular image data corresponding to the area in which the character recognition was performed can be transmitted to the editing terminals 107*a*–107*c*. As a result, at the editing terminals 107*a*–107*c*, the image information corresponding to the part where character recognition was performed and the character recognition result information obtained from the actual character recognition can be compared so that it is possible to easily determine whether or not the character recognition was accurately performed.

Further, only the image information of the part where the character recognition was performed, i.e, only the image information that is necessary for the comparison with the character recognition result information, is transmitted. Thus, the amount of the data to be transmitted can be reduced. As a result, the network loads can be reduced.

Further, in the above embodiment mode, electronic mail is used for the transmission of the recognition result data so that transmission to a wide area using the Internet is possible. Thereby, it is possible to give the system having the character recognition apparatus 101 and the editing terminals 107*a*–107*c*, the ability to be used for general purposes. As a result, more people may use this system in case of disaster etc. and can certainly confirm whether or not a victim of the disaster is alive.

Further, in accordance with the above embodiment mode, a larger area, in terms of both width and height, than the rectangular area where the character recognition is carried out can be cut out and be sent to the editing terminals 107*a*–107*c*. As a result, the information, which is written outside the rectangular area and which indicates for what information the rectangular is provided can be transmitted to the editing terminals 107*a*–107*c*. Therefore, at the end of the editing terminals 107*a*–107*c*, it is assuredly recognizable for what information the rectangular area is provided and what information is written in such rectangular area.

Further, in the above embodiment mode, the fact that the character recognition has failed as well as the image information of an original document (form) upon which the character recognition was performed are transmitted to the editing terminals 107*a*–107*c*. Therefore, at the end of the editing terminals 107*a*–107*c*, not only it is possible to realize the fact that the character recognition has failed but it is also possible to perform a character recognition while viewing the original image information. As a result, accurate character recognition of the original document can be done; and accordingly, accurate information can be stored in the database 108.

Further, in the above embodiment mode, in accordance with the addresses of the IFAX 103*a*–103*c* from which the image information is being transmitted, the mail servers which are to be used in transmitting the recognition data as well as the editing terminals 107*a*–107*c* are switched. Therefore, it is possible to maintain well balanced loads on the networks, the mail server 106*a* and 106*b*, and the editing terminals 107*a*–107*c*.

Further, in the above embodiment mode, it is possible to make a single attachment file by consolidating a plurality of rectangular images into a single multi-page TIFF file. Thus, the processing at the editing terminals 107*a*–107*c* can be made easier since the data processing can be done all together.

Further, in the above embodiment mode, by using a G3FAX 105, the original document can be read easily and the image information so read can be transmitted easily to a character recognition apparatus; therefore, anyone who knows how to use a facsimile machine can use this system. As a result, the capability for the general purpose use is enhanced.

Figure 10:
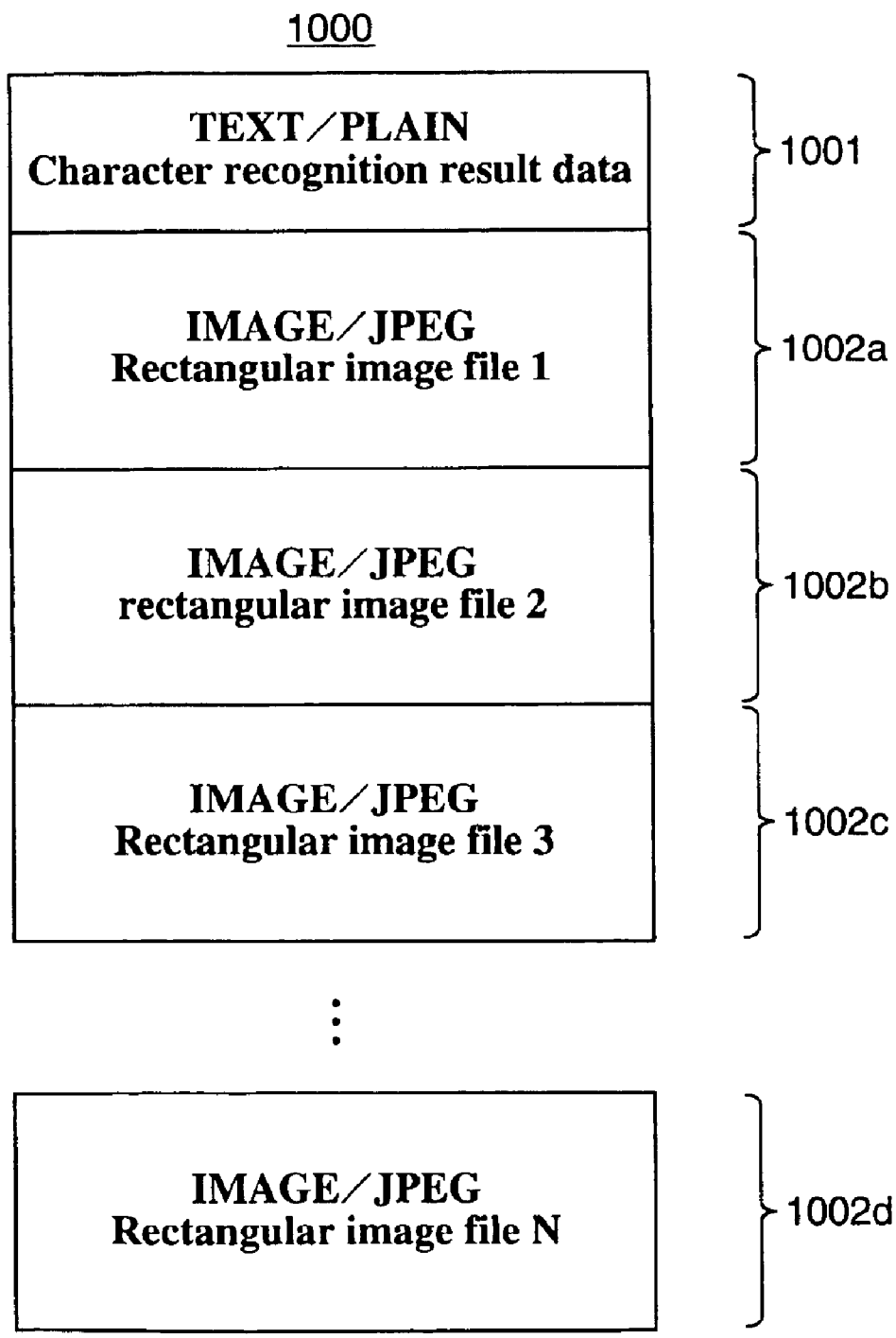
FIG. 10 is a figure showing another example of the recognition result data that the recognition result generation unit of the above-noted embodiment mode creates.

Further, although, in the above embodiment mode, an explanation was given using the example in which a plurality of rectangular images are consolidated to a single attached file, namely, a multi-page TIFF file, an other mode is possible such that each rectangular image data may be created as a single image file (files such as BMP, GIF, JPEG, etc.) and attachment files may be created for each of such rectangular images, respectively, is also within the scope of the present invention. With reference to FIG. 10, that mode will be explained below. FIG. 10 shows another example of the recognition result data that the recognition result generation unit 112 of the above embodiment mode creates.

As can be understood from FIG. 10, in the recognition result data 1000, the character recognition result data 1001 and a plurality of the rectangular image files of JPEG 1002*a*–1002*d* are included. These rectangular image files 1002*a*–1002*d* are converted to electronic mail data, respectively. Further, these rectangular image files 1002*a*–1002*d* become attachment files, respectively by being transmitted to the editing terminals 107*a*–107*c*. Accordingly, the editing terminals 107*a*–107*c* can open and confirm these rectangular image files 1002*a*–1002*d* one by one.

Further, each processing unit contained in the character recognition apparatus 101 can be constructed by dedicated hardware or the function of each processing unit may be achieved by a CPU of a PC. In the case the function of each processing unit is performed by a computer, programs for execution of such function of each processing unit by a computer are to be created and such programs can be stored in a memory medium; and the computer downloads such stored programs in the memory medium. In this manner, by having computer execute the processes of each processing unit, an ability of the invention and of the PC to used for general purposes is enhanced.

The present disclosure relates to subject matter contained in priority Japanese Application No. 2000-378369, filed on Dec. 13, 2000, which is herein expressly incorporated by reference in its entirely.

What is claimed is:

1. An information communications apparatus, comprising:
   a character recognition section that generates character recognition result information resulting from character recognition of image information;
   an image information cutout section that cuts out character recognition image information from the image information, the character recognition image information corresponding to an area with respect to which the character recognition is performed;

a recognition result generation section that generates recognition result information which is composed of the character recognition result information and the character recognition image information; and a recognition result transmission section that transmits the recognition result information to other terminals using electronic mail.

2. The information communications apparatus according to the claim 1, wherein said image information cutout section cuts out image information, as the character recognition image information, of a larger area than the area with respect to which the character recognition is performed.

3. The information communications apparatus according to the claim 1, wherein, said recognition result generation section, when a character recognition of the image information could not be performed, generates recognition result information which is includes information indicating that the character recognition could not be performed and the image information.

4. The information communications apparatus according to the claim 1, wherein said recognition result transmission section determines to which of the other terminals the recognition result information should be transmitted in accordance with a sender of the image information.

5. The information communications apparatus according to the claim 1, wherein said recognition result generation section retains the character recognition result information as code data, and generates the recognition result information by generating electronic mail having a TIFF file converted from the character recognition image information as an attachment file.

6. The information communications apparatus according to the claim 5, wherein, when the image information cut out section cuts out more than one character recognition image information, a plurality of the character recognition image information is converted to a multi-page TIFF file.

7. The information communications apparatus according to the claim 6, wherein, when the image information cut out section cuts out more than one character recognition image information, said recognition result generation section generates and attaches to the electronic mail a plurality of files, each of which is generated for each of the character recognition image information.

8. An information communications system comprising:

a facsimile apparatus that transmits image information;

an information communications apparatus according to the claim 1, said information communication apparatus receiving the image information from said facsimile apparatus;

an editing terminal that receives the recognition information from said information communications apparatus and edits the character recognition result; and a database that stores a character recognition result edited by said editing terminal.

9. An information communications apparatus, comprising:

a character recognition section that generates character recognition result information resulting from character recognition of image information;

an image information cutout section that cuts out character recognition image information from the image information, the character recognition image information corresponding to an area with respect to which the character recognition is performed;

a recognition result generation section that generates recognition result information which is composed of the character recognition result information and the character recognition image information; and a recognition result transmission section that transmits the recognition result information to other terminals using electronic mail;

wherein said image information cutout section cuts out the character recognition image information of a larger area than the area with respect to which the character recognition is performed;

wherein said recognition result generation section retains the character recognition result information as code data, and generates the recognition result information by generating electronic mail having a TIFF file, converted from the character recognition image information, as an attachment file;

wherein said recognition result transmission section determines to which of the terminals the recognition result information should be transmitted in accordance with a sender of the image information.

10. A method of information communications, comprising:

generating character recognition result information resulting from character recognition of image information;

cutting out character recognition image information from the image information which corresponds to an area with respect to which the character recognition is performed;

generating recognition result information which is composed of the character recognition result information and the character recognition image information; and transmitting the recognition result information to other terminals using electronic mail.

* * * * *